(12) United States Patent
Sumimoto

(10) Patent No.: US 7,296,452 B2
(45) Date of Patent: Nov. 20, 2007

(54) METALLIC WIRE FOR GRIP RINGS, PRODUCING METHOD AND APPARATUS THEREOF, PRODUCING METHOD AND APPARATUS OF GRIP RINGS FOR TUBE CONNECTOR WITH USE OF METALLIC WIRE AND GRIP RINGS FOR TUBE CONNECTOR

(75) Inventor: Shin Sumimoto, Hyogo (JP)

(73) Assignee: Hiroaki, Kanai, Ashiya-shi (JP)

( * ) Notice: Subject to any disclaimer, the term of this patent is extended or adjusted under 35 U.S.C. 154(b) by 0 days.

(21) Appl. No.: 11/605,575

(22) Filed: Nov. 29, 2006

(65) Prior Publication Data

US 2007/0068592 A1 Mar. 29, 2007

Related U.S. Application Data

(62) Division of application No. 10/478,199, filed as application No. PCT/JP02/06628 on Jul. 1, 2002.

(30) Foreign Application Priority Data

Jul. 3, 2001 (JP) .............................. 2001-201845
Aug. 28, 2001 (JP) .............................. 2001-257770

(51) Int. Cl.
*B21F 37/00* (2006.01)
*F16L 21/08* (2006.01)

(52) U.S. Cl. ........................... 72/129; 72/275; 72/278; 72/264; 140/76; 140/88; 285/322

(58) Field of Classification Search .................. 72/275, 72/278, 356, 370.21, 129, 371, 338, 324, 72/131, 166–175, 184–198; 24/283, 26–29; 285/249, 104, 105, 339, 322, 323, 324; 140/88, 140/76; 29/34 D, 888.07, 888.076
See application file for complete search history.

(56) References Cited

U.S. PATENT DOCUMENTS 1,771,955 A * 7/1930 Fork et al. ..................... 72/129
2,128,437 A * 8/1938 Stenwall ....................... 72/129

(Continued)

FOREIGN PATENT DOCUMENTS

JP 61-27533 2/1986

(Continued)

OTHER PUBLICATIONS

International Search Report for PCT/JP02/06628 dated Oct. 29, 2002.

*Primary Examiner*—Dmitry Suhol
(74) *Attorney, Agent, or Firm*—Marshall, Gerstein & Borun LLP

(57) ABSTRACT

Disclosed are metallic wire with high surface quality and low-cost suitable for use as material for grip rings and a producing method and apparatus thereof.

Metallic wire 34 deformed in a coil shape is passed through a shape correction unit 14 so as to straighten it. Furthermore, while upper and lower pressing rollers 19, 20, 26, 27 prevent the metallic wire 34 from warping upwardly and downwardly, wedge-shaped grooves are continuously formed on the metallic wire 34 by means of a first cutting roller 21 and a second cutting roller 23.

3 Claims, 8 Drawing Sheets

U.S. PATENT DOCUMENTS 3,920,270 A * 11/1975 Babb, Jr. .................... 285/104
4,823,576 A * 4/1989 Yoshioka .................... 72/11.1
5,357,776 A * 10/1994 Duran ........................ 72/275
5,582,051 A   12/1996 Ishikawa et al.
6,370,860 B1 * 4/2002 Adrian ........................ 59/80

FOREIGN PATENT DOCUMENTS

JP        2001-124263        5/2001

* cited by examiner (a)

(b)

(c)

(d)

(a)  (b)

(a)          (b)

(a)          (b)

(a)  (b)  (c)

METALLIC WIRE FOR GRIP RINGS, PRODUCING METHOD AND APPARATUS THEREOF, PRODUCING METHOD AND APPARATUS OF GRIP RINGS FOR TUBE CONNECTOR WITH USE OF METALLIC WIRE AND GRIP RINGS FOR TUBE CONNECTOR

CROSS REFERENCE TO RELATED APPLICATION

This is a divisional of U.S. Ser. No. 10/478,199 filed May 10, 2004, which is the U.S. National Phase of PCT/JP02/06628 filed Jul. 1, 2002, that claims priority from JP 2001-201845 filed Jul. 3, 2001, and JP 2001-257770 filed Aug. 28, 2001, the entire disclosure of which are incorporated herein by reference.

TECHNICAL FIELD

The present invention relates to metallic wire, more specifically to metallic wire for grip rings to be used in a tube connector, which is a metallic connector, for connecting tubes to be inserted through both ends thereof, requiring no finishing treatment on ends of the tubes but preventing movement of the tubes in the axial direction.

Furthermore, the present invention relates to grip rings to be used in a tube connector, which is a metallic connector, for connecting tubes to be inserted through both ends thereof, requiring no finishing treatment on ends of the tubes but preventing movement of the tubes in the axial direction.

BACKGROUND ART

Connectors are used to connect tubes for piping which have been heavily used in the industrial equipment to each other. Connectors with various kinds of structures capable of immobilizing tubes with respect to each other and ensuring the sealing performance at the connecting portion have been proposed. Among the structures associated with strong immobilizing means, those associated with a flange method, a screw-in method, a welding method, and the like have been in heavy usage. However, piping work is not efficient and potential leakage due to improper piping work can not be ignored either.

Thus, simplified connectors which do not require processes such as threading, welding, and the like and are adapted for a little eccentricity of tubes with respect to each other have been often used. In the simplified connector, with a rubber gasket and a retainer attached to each end of a sleeve member by means of coupling, the sealing at end potions of tubes is ensured by the elasticity of the rubber gaskets, and as-cut end portions of the tubes are connected to each other only through tightening the coupling. Furthermore, in some uses, the members are initially assembled into a single connector and then each end portion of the tubes is inserted into the single connector from both of the directions so as to connect the tubes to each other.

In the simplified connector described above, because the rubber gasket is forced to tightly contact with the tube only through tightening the coupling, the connected tube is allowed to move in the axial direction. And, if the tube moves and comes off, an internal fluid will leak. Then, if the internal fluid is hot or a hazardous chemical, it should be extremely dangerous and may lead to a serious disaster. Thus, in order to avoid such a disaster, a preventive arrangement for preventing the tube from coming off, such as always fixing the tube to a floor or a wall, is additionally required, resulting in increase in cost due to such construction.

Thus, as shown in FIG. 1, a grip ring 2, which is produced from spring steel made of stainless steel or steel and has wedge-shaped grooves 1 in the circumferential direction of the inner face thereof, has been used as one of the constitutional members for the tube connector. The tube connector having the grip rings has been disclosed in Published Japanese Translations of International Application Publication of Japanese Patent Application No. 2001-507782. It will be described with reference to FIG. 2. Referring now to FIG. 2, reference numeral 3 denotes a rotatable connecting piece, and reference numeral 4 denotes a fixed connecting piece. The grip ring 2 is tightly in contact with an inner face of the connecting piece 3, one end of the grip ring 2 is engaged in an engaging piece 5, and this engaging piece 5 is fixed through a fixing mechanism comprised of a bolt 6 and a nut 7. Furthermore, a rubber gasket 8 is tightly in contact with an inner face of the connecting piece 4. Inner diameters of the grip ring 2 and the rubber gasket 8 are formed to be slightly larger than an outer diameter of the tube to be inserted into this connector. If a tube is inserted into the tube connector from both sides, the bolt 6 is removed from the nut 7, and the engaging piece 5 is pulled out, then, in response to a spring action of the grip ring 2, wedge-shaped grooves 1 would bite into the tube and thereby inhibit the movement of the tube in the axial direction. Furthermore, the connecting piece 3 is turned around along an inner face of the connecting piece 4, and the connecting piece 3 and the connecting piece 4 are then tightly connected by means of the bolt 6 and the nut 7.

In this way, the use of the connector having the grip rings makes it possible to inhibit the movement of the tube in the axial direction and fix it tightly. These grip rings have been conventionally produced in the following way.

The producing method comprises the following steps: winding up metallic wire with predetermined shape; in a coil shape; cutting out a predetermined length of the metallic wire from the metallic wire wound in the coil shape; "bending" the cut-out portion of the metallic wire to be ring shaped; "welding" together both ends of the ring-shaped metallic wire so as to turn the blended metallic wire to be topic-shaped; performing "strain relieving annealing" to eliminate the thermal strain associated with the welding; performing "machine cutting" to provide wedge-shaped grooves on the inner face of the topic-shaped metallic wire in the circumferential direction by use of a lathe turning machine or the like; "cutting the welded portion" to obtain a ring piece which is a discrete entity from the topic-shaped metallic wire which is a continuous entity; and performing "cut treatment" on both ends of the ring piece to complete the work.

As described above, the conventional producing method of the grip rings requires many process steps. Furthermore, the steps of welding, annealing for relieving the strain, and cutting the welded portion are extra steps in view of forming the wedge-shaped grooves and hence not necessary. Another problem is that the material is not efficiently utilized because the welded portion is cut off. What is worse, there is a drawback that the value of finished products is lowered since the welding and the annealing for relieving the'strain cause the surface to be oxidized and discolored, leading to the deterioration of the surface quality. Thus, with the conventional producing method, increase in production cost can not be avoided and the grip rings with high-quality can not be provided either.

The present invention is directed to solve the problems described above, and an object thereof is to provide metallic wire for grip rings with high surface quality and low-cost. Furthermore, another object of the present invention is to provide a method for effectively producing metallic wire for grip rings. Even furthermore, another object of the present invention is to provide an apparatus suitable for producing metallic wire for grip rings. Furthermore, another object of the present invention is to provide a method for effectively producing grip rings for tube connectors using metallic wire. Even furthermore, another object of the present invention is to provide an apparatus suitable for producing the grip rings for tube connectors. Still furthermore, the other object of the present invention is to provide the grip ring with high surface quality and low-cost for tube connectors.

DISCLOSURE OF INVENTION

The most important feature of the present invention in order to achieve the objects described above is to continuously perform the machine cutting on the metallic wire. Because of this feature of the present invention, it is now possible to provide the metallic wire with high surface quality and low-cost suitable for use as material for grip rings.

The metallic wire for grip rings of the present invention is obtained through unwinding coil-shaped metallic wire and continuously performing machine cutting on the unwound metallic wire.

Furthermore, a producing method of metallic wire for grip rings of the present invention comprises unwinding coil-shaped metallic wire and continuously performing machine cutting on the unwound metallic wire.

Furthermore, a producing method of grip rings for tube connectors of the present invention comprises unwinding coil-shaped metallic wire, continuously performing machine cutting on the unwound metallic wire, processing the machine cut metallic wire to be ring-shaped, which is then sheared into a ring piece with predetermined length, and performing cutting treatment on both ends of the ring piece with predetermined length.

Furthermore, a producing apparatus of metallic wire for grip rings of the present invention comprises a machine cutting device for continuously performing machine cutting on the metallic wire.

Furthermore, a producing apparatus of grip rings for tube connectors of the present invention comprises a machine cutting device for continuously performing machine cutting on metallic wire, a ring forming device for processing the machine cut metallic wire to be ring-shaped, a shearing device for shearing the ring-shaped metallic wire into a ring piece with predetermined length, and a cutting device for performing cutting treatment on both ends of the ring piece with predetermined length.

The machine cutting device described above preferably comprises a shape correction unit for straightening the metallic wire deformed in a coil shape, which is comprised of at least a pair of upper and lower shape correction rollers and at least a pair of left and right shape correction rollers, and at least a pair of cutting roller units for continuously performing the machine cutting on the metallic wire, which are comprised of a cutting roller provided with a cutting blade formed on an outer peripheral face thereof and a support roller.

A pair of upper and lower pressing rollers are preferably provided forward and rearward of the cutting roller unit so as to prevent the metallic wire from warping upwardly and downwardly.

In accordance with an aspect of the invention, it is possible to provide metallic wire for grip rings with high surface quality and low-cost.

In accordance with an aspect of the invention, it is possible to provide a low-cost producing method of metallic wire for grip rings having no many process steps.

In accordance with an aspect of the invention, it is possible to provide a low-cost producing method of grip rings for tube connector by which the material is efficiently utilized with no many process steps and no extra steps.

In accordance with an aspect of the invention, it is possible to provide an apparatus suitable to continuously perform the machine cutting on the metallic wire together with correcting and straightening of the metallic wire deformed in a coil shape.

In accordance with an aspect of the invention, it is possible to prevent the metallic wire from warping upwardly and downwardly in the machine cutting step.

In accordance with an aspect of the invention, it is possible to provide grip rings for tube connector with high surface quality and low-cost.

BEST MODE FOR CARRYING OUT THE INVENTION

The above object, as well as other objects, features and advantages of the invention will become more apparent to those skilled in the art from the following description taken with reference to the accompanying drawings.

Hereinbelow, preferred embodiments of the present inventions will be described with reference to drawings.

Figure 3:
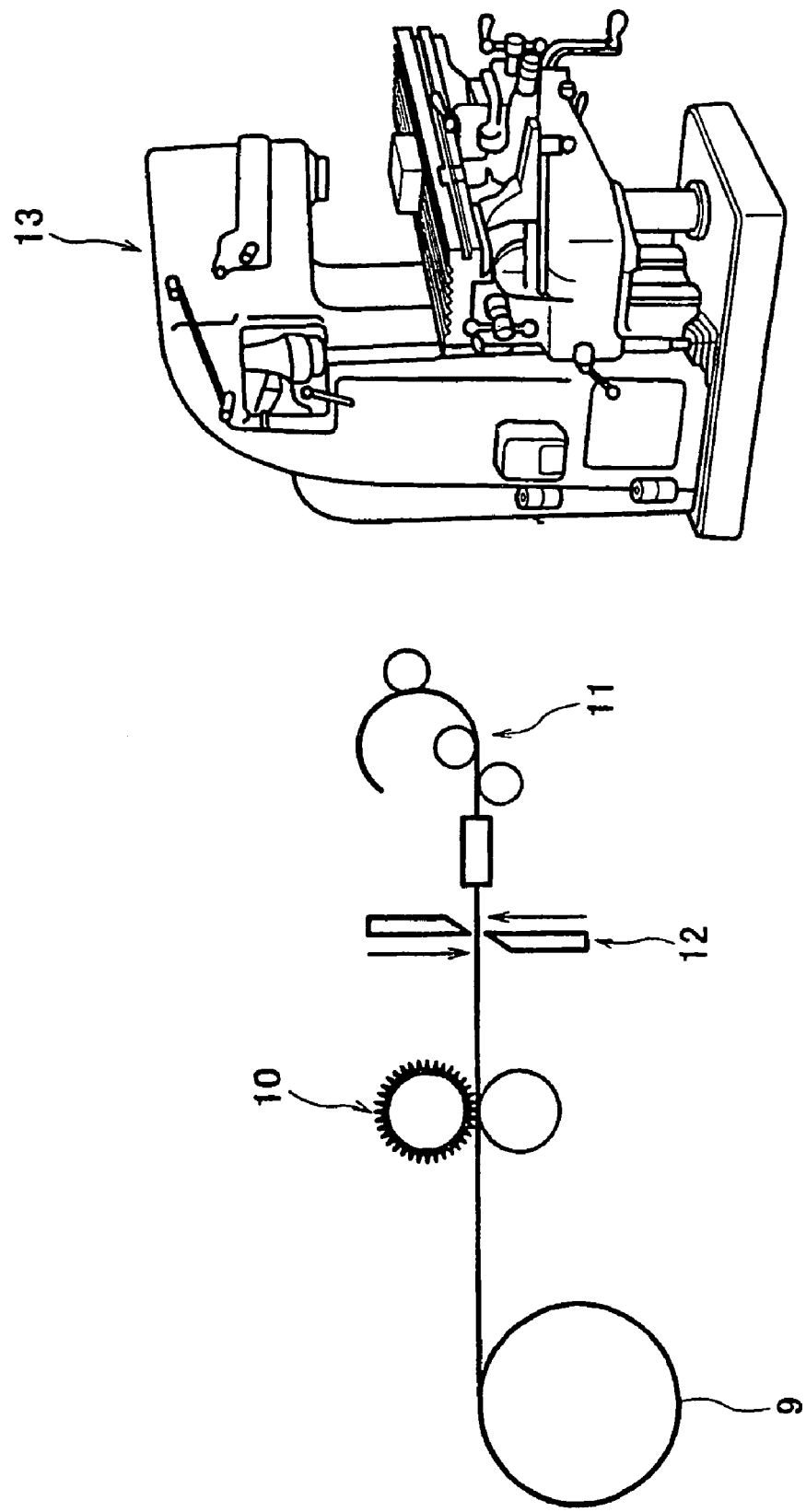
FIG. 3 is a schematic constitution view of a producing apparatus of grip rings.

In FIG. 3, reference numeral 9 denotes metallic wire wound in a coil shape, reference numeral 10 denotes a machine cutting device (a device for producing the metallic wire for grip rings) for unwinding the metallic wire wound in the coil shape and continuously performing wedge-shape grooving on the unwound metallic wire, reference numeral 11 denotes a ring forming device for processing the metallic wire on which the wedge-shape grooving was performed to be ring-shaped, reference numeral 12 denotes a shearing device for shearing the ring-shaped metallic wire to which the ring forming was performed to produce a ring piece with predetermined length. Shearing device 12 is incorporated into the ring forming device 11. Reference numeral 13 denotes a cutting device (for example, a milling machine) for performing cutting treatment on both ends of the ring piece with predetermined length. The machine cutting device 10 is in detail shown in FIG. 4, and the ring forming device 11 is in detail shown in FIG. 7.

Material for the metallic wire, if it is used for the grip rings, is preferably stainless steel wire for spring (especially, SUS304-WPB prescribed in JIS-G-4314). Its tensile strength is preferably 500 to 2000 $N/mm^2$, although it depends on the wire diameter. If it is below 500 $N/mm^2$, it is not strong enough and if it is above 2000 $N/mm^2$, there arise a problem that it is difficult to insert a tube into a connector.

Furthermore, the diameter of the metallic wire for grip rings can be 2 to 20 mm. Even furthermore, before being wound in a coil shape at continuous machine cutting, the metallic wire for grip rings would be straightened by a straightening process (a machining process to straighten it through upper and lower or left and right shape correction rollers) such that its deflection (the amount of deflection from its straight line) is preferably kept below 20 mm/m. If the deflection exceeds 20 mm/m, there arise a problem that machine cutting of poor quality is generated by small amplitude of vibration during machine cutting operation.

Figure 4:
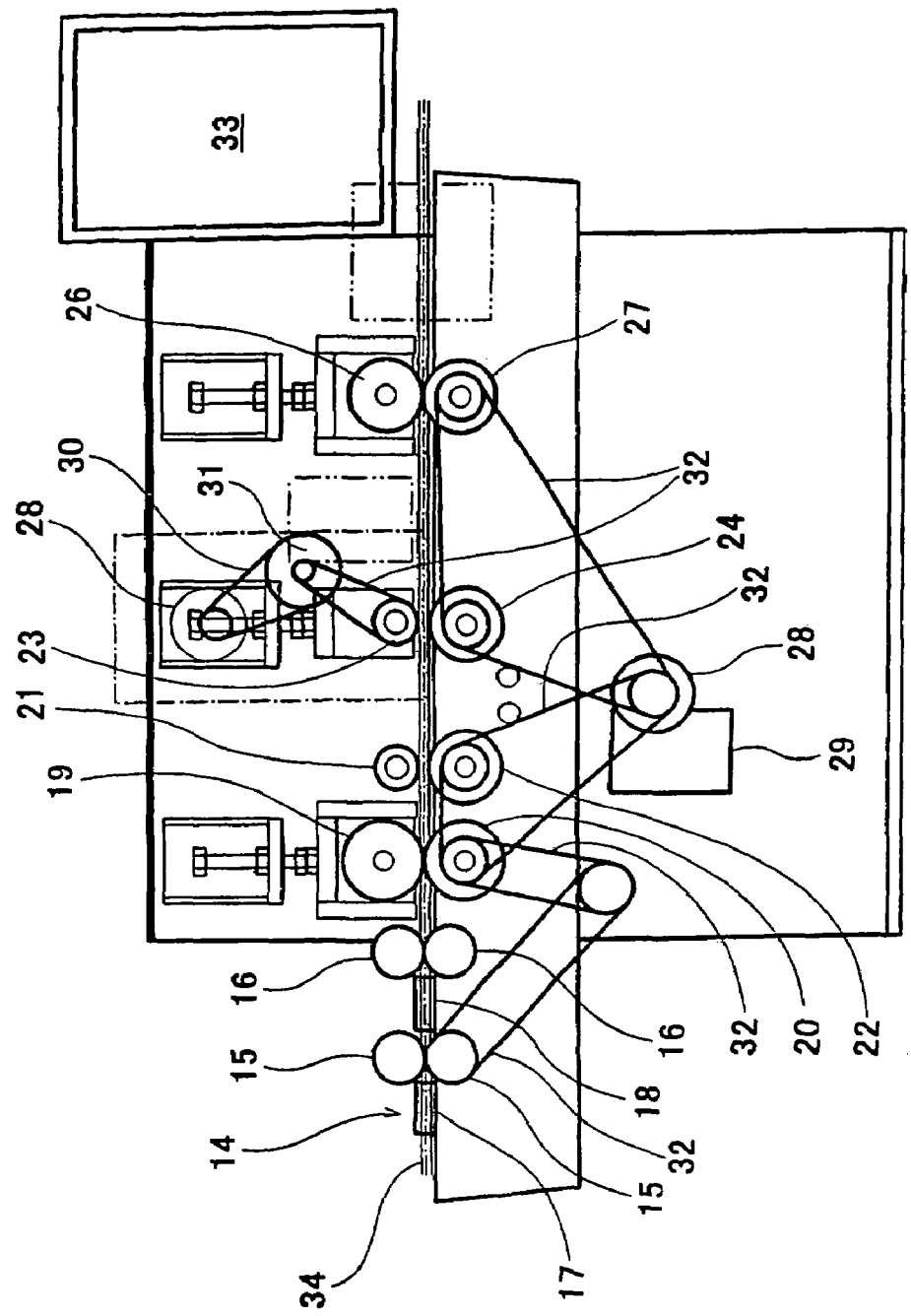
FIG. 4 is a side elevation view of a machine cutting apparatus.

In FIG. 4, reference numeral 14 denotes a shape correction unit, comprised of two pairs of upper and lower shape correction rollers 15, 15, 16, 16 and two pairs of left and right shape correction rollers 17, 17, 18, 18. The other of the left or right shape correction roller 17 or 18 is provided at the opposite side (not shown, see FIG. 4). It is preferable that these shape correction rollers, as shown in FIGS. 5(a) and 5(b), have shapes conforming to an outer shape of a circular section of the metallic wire 34. While this shape correction unit is comprised of two pairs of upper and lower shape correction rollers and two pairs of left and right shape correction rollers, it may be comprised of a pair of upper and lower shape correction rollers and a pair of left and right shape correction rollers. Alternatively, a method in which material to be corrected is passed between rollers so as to correct the shape of the material, that is, a roller leveler, can also be used.

In FIG. 4, reference numerals 19, 20 respectively denote an upper pressing roller and a lower pressing roller which are provided forward of the cutting roller unit. It is preferable that these upper and lower pressing rollers, similarly to the shape correction rollers shown in FIG. 5(a), have shapes conforming to the outer shape of the circular section of the metallic wire 34.

Figure 5:
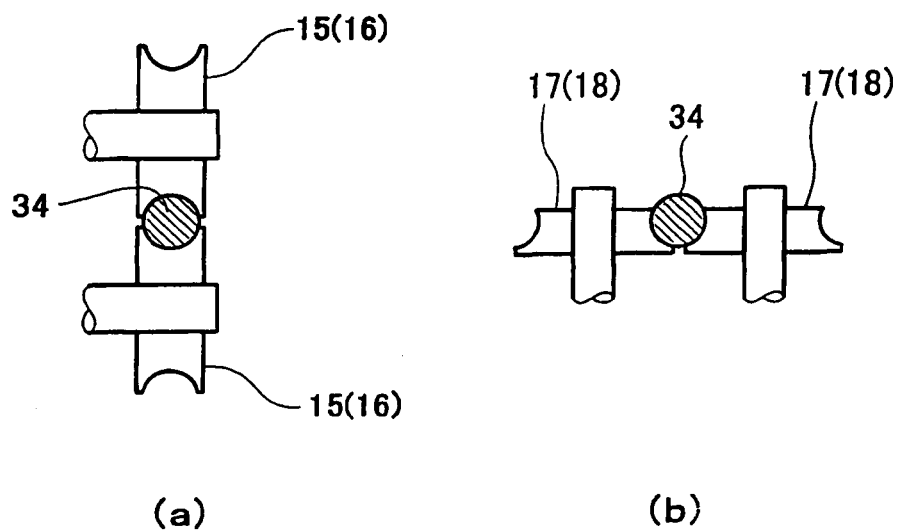
FIG. 5(a) is a view showing an engaging relationship among upper and lower shape correction rollers and metallic wire.
FIG. 5(b) is a view showing an engaging relationship among left and right shape correction rollers and metallic wire.
Figure 6:
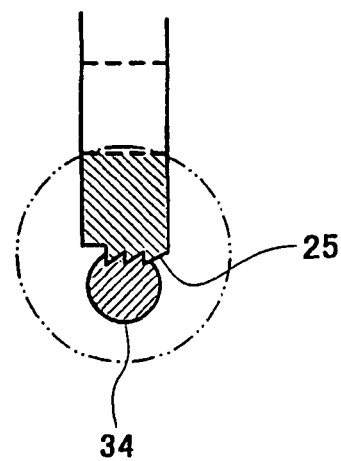
FIG. 6 is a view showing an engaging relationship between a cutting roller and metallic wire.

In FIG. 4, reference numeral 21 denotes a first cubing roller, reference numeral 22 denotes a first support roller, reference numeral 23 denotes a second cutting roller, and reference numeral 24 denotes a second support roller. In the present embodiment, there are provided two pairs of cutting roller units. As shown in FIG. 6, a cutting blade 25 is formed on outer peripheral faces of the first cutting roller 21 and the second cutting roller 23 so as to perform the wedge-shape grooving on the metallic wire 34. Furthermore, it is preferable that the first support roller 22 and the second support roller 24, similarly to the shape correction rollers in FIG. 5(a), have shapes conforming to the outer shape of the circular section of the metallic wire 34. While FIG. 4 shows a first cutting roller and a second cutting roller, in some cases, only one cutting roller may be needed and in other cases, three or more cutting rollers may be used.

In FIG. 4, reference numerals 26, 27 denote the upper pressing roller and the lower pressing roller which are provided backward of the cutting roller unit. It is preferable that these upper and lower pressing rollers, similarly to the shape correcting rollers in FIG. 5(a), have shapes conforming to the outer shape of the circular section of the metallic wire 34. Furthermore, it is possible to install upper and lower pressing rollers between the first cutting roller 21 and the second cutting roller 23.

In FIG. 4, reference numeral 28 denotes a motor, and reference numeral 29 denotes an inverter which controls the speed of the motor 28. Reference numeral 30 denotes a timing belt, reference numeral 31 denotes a intermediate gear, reference numeral 32 denotes a transmission belt, and reference numeral 33 denotes an operation board.

Figure 7:
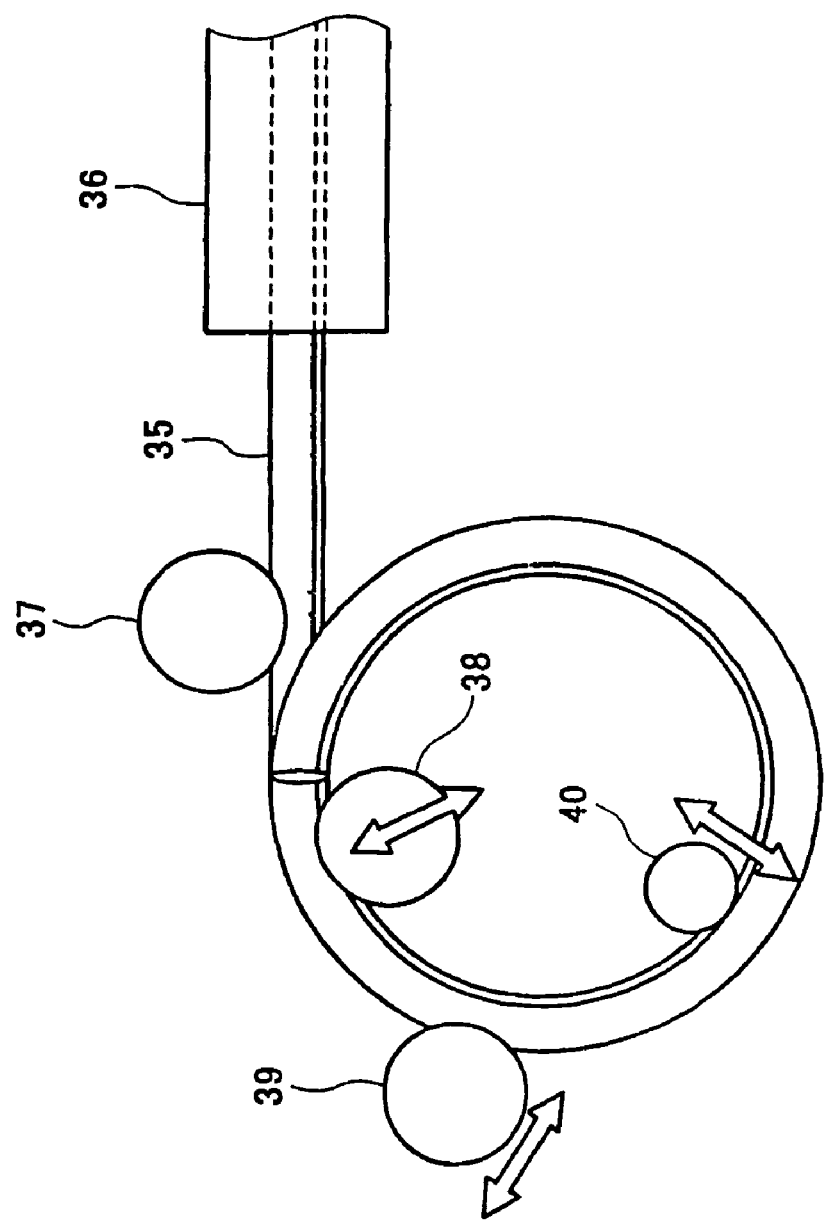
FIG. 7 is a schematic constitution view of an ring forming device.

In FIG. 7, the ring forming device for processing the metallic wire 35 to which the wedge-shape grooving was performed to be ring-shaped is comprised of a metallic wire introducing appliance 36, a first guiding member 37, a first movable roller 38, a second movable roller 39, and a third movable roller 40. These movable rollers can be moved to regulate the diameter of ring by an operation unit (not shown) in the direction of the arrow.

Metallic wire produced by means of the above producing apparatus of metallic wire for grip rings of the present invention can be processed to produce the grip rings for tube connectors by means of the ring forming device, the shearing device, and the machine cutting device as described below.

The metallic wire wound in a coil shape is unwound and then the machine cutting is continuously performed on the unwound metallic wire by means of the machine cutting device. Specifically, as shown in FIG. 4, the unwound metallic wire 34 goes through the shape correction unit 14 so as to correct and straighten the metallic wire deformed in a coil shape. Furthermore, while the upper and lower pressing rollers 19, 20, 26, 27 prevent the metallic wire 34 from warping upwardly and downwardly and the first support roller 22 and the second support roller 24 support the metallic wire 34, the wedge-shape grooves are continuously formed on the metallic wire 34 by means of the first cutting roller 21 and the second cutting roller 23. Functions expected by these pressing rollers are controlling a passing line of the metallic wire, controlling a travel speed of the metallic wire by controlling a rotational speed of the lower pressing rollers 20, 27, and preventing vibration associated with the cutting process.

Figure 8:
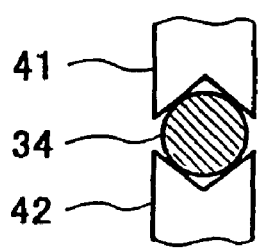
FIG. 8(a) is a view showing an example in which metallic wire is clamped by upper and lower pressing rollers.
FIG. 8(b) is a view showing another example in which metallic wire is clamped by upper and lower pressing rollers.
Figure 8:
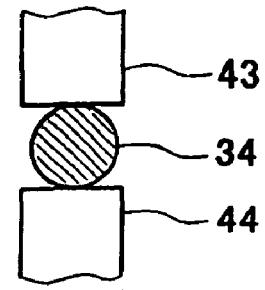

The force to be used for clamping the metallic wire through the upper and lower pressing rollers is preferably higher than 10 $N/cm^2$. However, since too much of the clamping force may make it difficult to control the moving speed of the metallic wire and, in some cases, result in the plastic deformation of the metallic wire, the clamping force should be preferably kept below 1000 N/cm². Furthermore, although as one way of contacting the pressing rollers with the metallic wire, the metallic wire 34 can be most stably clamped through the pressing rollers contacting with a curved surface of the metallic wire 34, as shown in FIG. 5(*a*), any other ways of contacting the pressing rollers with the metallic wire, such as clamping through each of the upper pressing roller 41 and the lower pressing roller 42 contacting with a plurality of points on the metallic wire 34 as shown in FIG. 8(*a*) or clamping through each of the upper pressing roller 43 and the lower pressing roller 44 contacting with a point on the metallic wire 34 as shown in FIG. 8(*b*), can also be used.

Furthermore, the distance between a center of the cutting roller and a center of each of the pressing rollers located forward and rearward of the cutting roller would be preferably shorter so as to obtain the effect described above. However, since if the distance is too long, the above effect can not be obtained the distance between a center of the cutting roller and a center of each of the pressing rollers located forward and rearward of the cutting roller would be preferably kept below 300 mm.

The above metallic wire with the wedge-shape grooves is processed to be ring-shaped through the ring forming device. Specifically, as shown in FIG. 7, the metallic wire 35 with a specific ring diameter can be realized by moving the first, the second and the third movable rollers 38, 39, 40 through the metallic wire introducing appliance 36 and the first guiding member 37 in the direction of the arrow. Among these movable rollers, the first movable roller 38 and the second movable roller 39 serve primarily to control the ring diameter and the third movable roller 40 serves primarily to decrease a variation of out-of-roundness and remove an internal stress. Then, the ring-shaped metallic wire is cut into a ring piece with predetermined length by means of the shearing device 12 incorporated into the ring forming device 11 as shown in FIG. 3.

Figure 1:
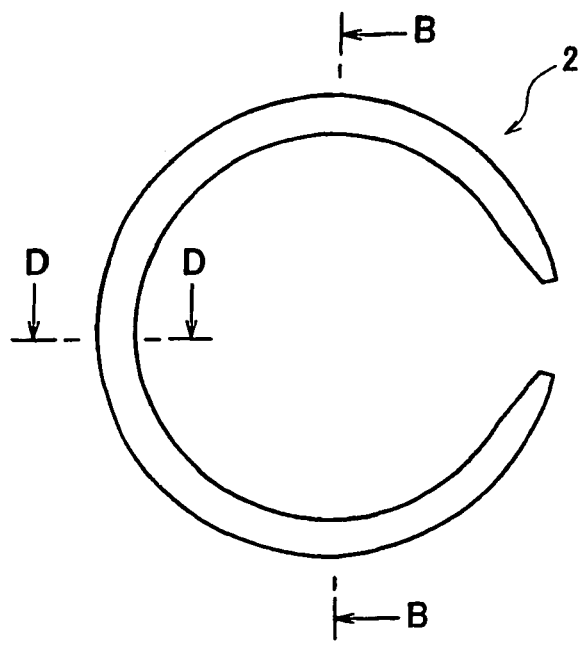
FIG. 1(a) is a side elevation view of a grip ring.
FIG. 1(b) is a cross-sectional view taken in the direction of arrows substantially along line B-B of FIG. 1(a)
FIG. 1(c) is a perspective view of the grip ring.
FIG. 1(d) is an expanded cross-sectional view taken in the direction of arrows substantially along line D-D of FIG. 1(a)
Figure 1:
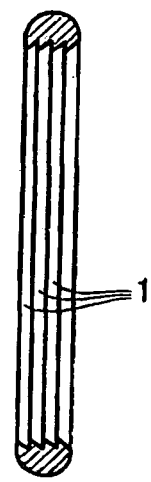
Figure 1:
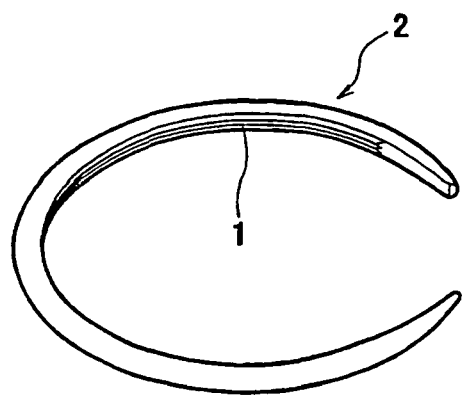
Figure 1:
Figure 2:
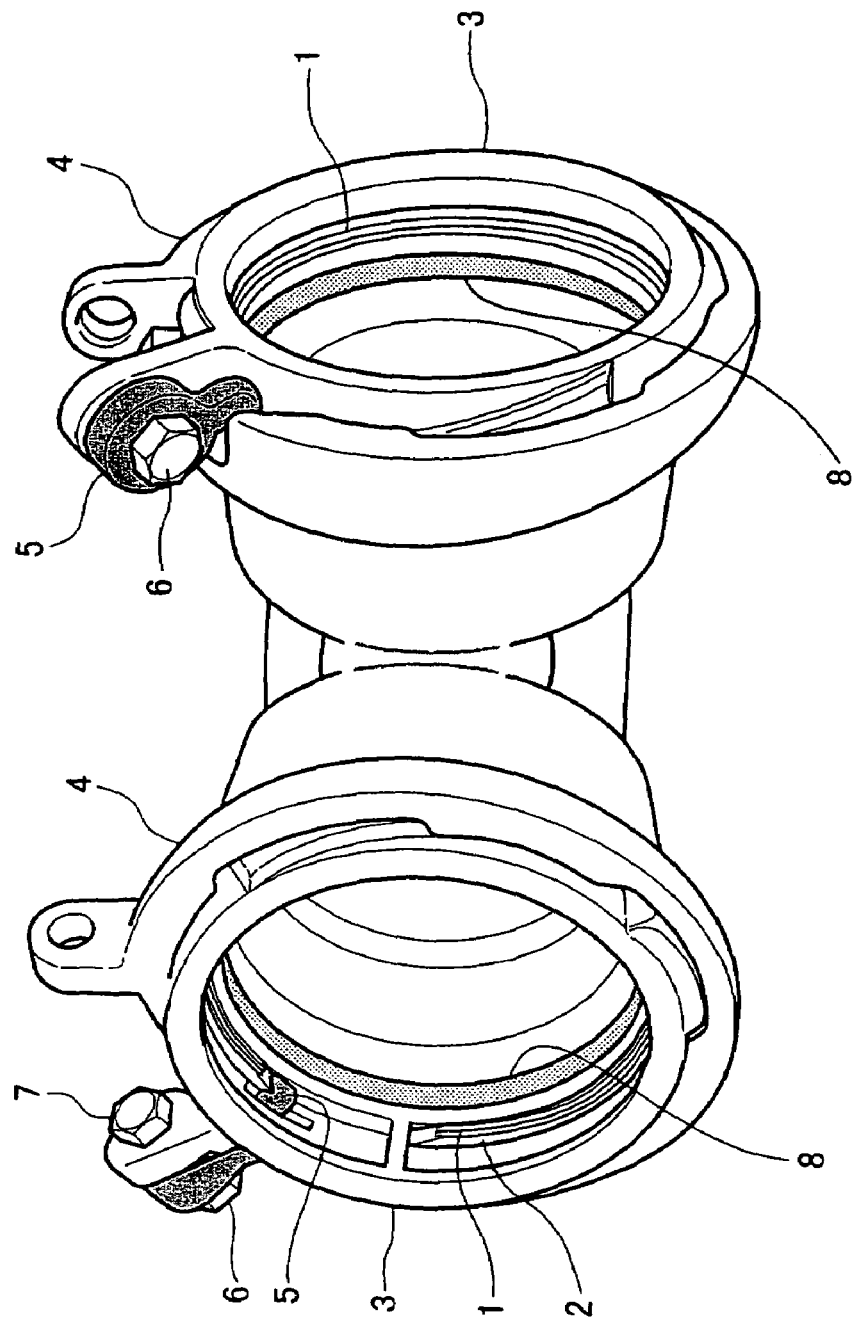
FIG. 2 is a perspective view of a tube connector with grip rings.

The grip ring 2 shown in FIG. 1 is obtained by performing the cutting treatment on both ends of the ring piece by means of the cutting device 13 shown in FIG. 3. The grip ring for the tube connectors according to the present invention does not have problems such as the surface oxidization and the surface discoloration coming from the welding process and the strain relieving annealing process which are required by the conventional producing method, and the surface is thus of high quality.

Figure 9:
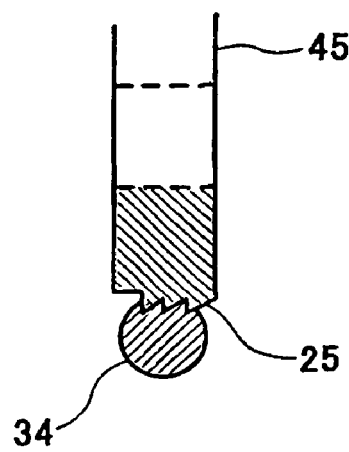
FIGS. 9(a) and 9(b) are views showing states in which upper and side portions of metallic wire are continuously cut.
Figure 9:
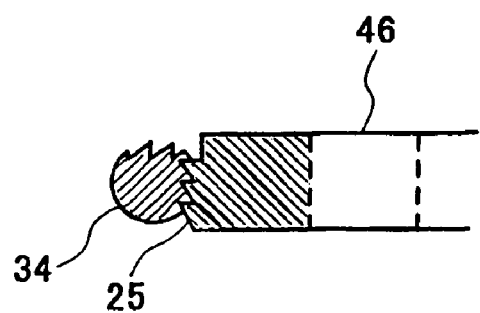

Although, in FIG. 4, both of the first cutting roller 21 and the second cutting roller 23 are cutting the metallic wire 34 from the above, the cutting rollers can be disposed so that a cutting roller 45 located upward of the metallic wire 34 first cut an upper portion of the metallic wire 34 as shown in FIG. 9(*a*), and another cutting roller 46 located laterally to the metallic wire 34 then cut a side portion of the metallic wire 34 as shown in FIG. 9(*b*). Furthermore, if a need arises, after cutting the upper portion and one side portion of the metallic wire 34 as shown in FIG. 9(*b*), another cutting roller (not shown) located laterally oppositely to FIG. 9(*b*) of the metallic wire 34 can cut the other side portion of the metallic wire 34.

Figure 10:
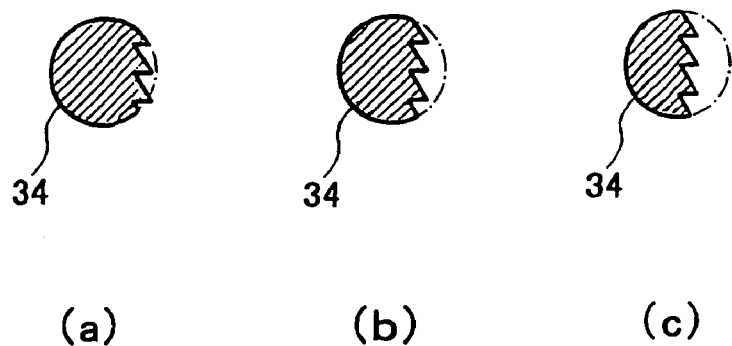
FIGS. 10(a)(b)(c) is a view showing a state in which metallic wire is cut in a multiple-step form.

Furthermore, the metallic wire 34 can be cut in a multiple-step as shown in FIGS. 10(*a*), 10(*b*) and 10(*c*). In this way, cutting metallic wire in a multiple-step can decrease the amount of the metallic wire to be cut per one step, thereby reducing the deformation stress of the metallic wire. Therefore, it is possible to increase the speed of the metallic wire passing through the cutting device (resulting in increase in the cutting efficiency). It should be noted that the number of cutting steps can be, if a need arises, more than 3 instead of 3 steps shown in FIG. 10.

Figure 11:
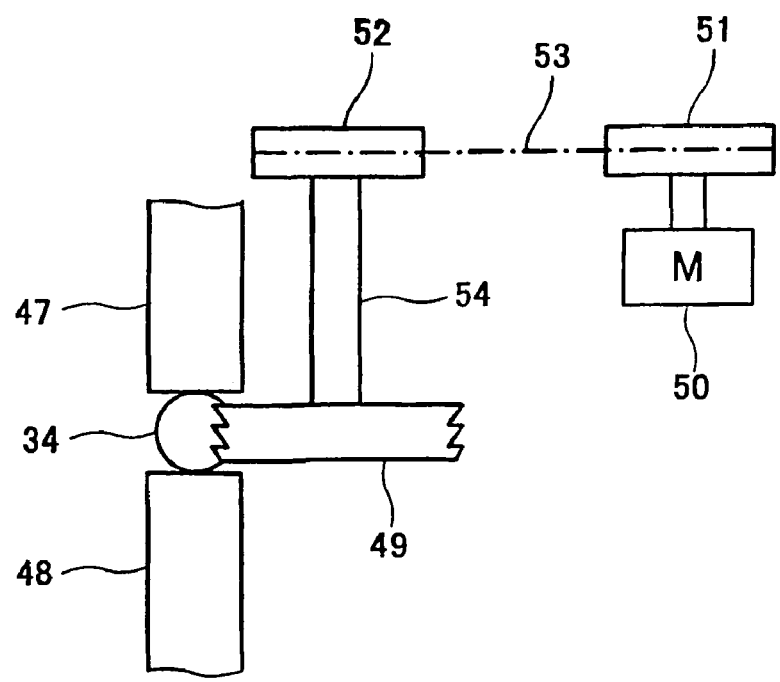
FIG. 11 is a view showing a manner in which metallic wire is prevented from warping.

Furthermore, as shown in FIG. 11, to prevent the metallic material 34 from warping during a cutting process, while the metallic wire 34 is tightly clamped by the upper and lower pressing rollers 47, 48 from the above and below, the cutting roller 49 located laterally to the metallic wire 34 can cut the metallic wire 34. Reference numeral 50 denotes a motor, and a driving sprocket 51 which is directly coupled to the motor 50 and a driven sprocket 52 are connected to each other by a belt 53. When the motor 50 rotates, the rotation is transmitted from the sprocket 51 through the sprocket 52 and a transmission shaft 54 to the cutting roller 49 via the belt 53 so as to continuously cut the metallic wire 34.

In the cutting device shown in FIG. 4, the first cutting roller 21, the second cutting roller 23, and the upper pressing rollers 19, 26 are driving rollers, and the other rollers are driven rollers. In this case, a driving pinch roller for feeding metallic wire can be provided forward of the cutting device, and a driving pinch roller for pulling out the metallic wire can be provided rearward of the cutting device. The driving pinch roller for feeding the metallic wire and the driving pinch roller for pulling out the metallic wire have an advantage of stability of speed by which the metallic wire pass the cutting device.

While, in FIG. 3, the ring forming device 11 is provided rearward of the cutting device 10 in series, the ring forming device 11 may be separately provided. In other words, after the machine cutting is continuously performed on the metallic wire by means of the machine cutting device and the processed metallic wire is rewound in a coil shape, then this coil-shaped metallic wire is unwound and processed to be ring-shaped by means of the ring forming device separately provided, followed by shearing the ring-shaped metallic wire into the ring piece with predetermined length.

Numerous modifications and alternative embodiments of the invention will be apparent to those skilled in the art in view of the forgoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

Since the present invention has the constitution described above, the present invention is suitable for apparatus producing the metallic wire with high surface quality and low-cost suitable for use as material for grip rings.

The invention claimed is:

1. A producing apparatus of grip rings for tube connectors to be used to connect tubes through tight contact with outer periphery of the tubes through which a fluid flows comprises:

a machine cutting device for continuously performing machine cutting on metallic wire;

a ring forming device for processing the machine cut metallic wire to be ring-shaped;

a shearing device for shearing the ring-shaped metallic wire into a ring piece with predetermined length;

a cutting device for performing cutting treatment on both ends of the ring piece with predetermined length; and wherein the machine cutting device comprises: a shape correction unit comprising at least a pair of upper and lower shape correction rollers and at least a pair of left and right shape correction rollers; and at least a pair of cutting roller units comprising a cutting roller provided with a cutting blade formed on an outer peripheral face thereof and a supporting roller.

2. The producing apparatus of grip rings for tube connectors according to claim 1, wherein a pair of upper and lower pressing rollers are provided forward and rearward of the cutting roller unit so as to prevent the metallic wire from warping upwardly and downwardly.

3. The producing apparatus of grip rings for tube connectors according to claim 1, wherein a pair of upper and lower pressing rollers are provided forward and rearward of the cutting roller unit so as to prevent the metallic wire from warping upwardly and downwardly.

* * * * *